United States Patent [19]

Kowallik et al.

[11] Patent Number: 5,628,911
[45] Date of Patent: May 13, 1997

[54] FILTRATION OF SOOT/ASH WATER SLURRIES AND IMPROVED PARTIAL OXIDATION PROCESS FOR HYDROCARBON FEEDSTOCKS

[75] Inventors: Wolfgang Kowallik, Itzehoe; Hans J. Maaz, Brunsbüttel; Thomas Schmitz, Wilster, all of Germany

[73] Assignee: Norsk Hydro a.s, Oslo, Norway

[21] Appl. No.: 432,212

[22] PCT Filed: Nov. 9, 1993

[86] PCT No.: PCT/NO93/00165

§ 371 Date: Aug. 4, 1995

§ 102(e) Date: Aug. 4, 1995

[87] PCT Pub. No.: WO94/11085

PCT Pub. Date: May 26, 1994

[30] Foreign Application Priority Data

Nov. 11, 1992 [NO] Norway ................. 924338

[51] Int. Cl.⁶ .................. C02F 1/54; C02F 1/56
[52] U.S. Cl. .................. 210/710; 210/723; 210/733; 210/734; 210/738; 48/197 R
[58] Field of Search .................. 210/723, 738, 210/726, 710, 734, 735, 733; 48/197 R

[56] References Cited

U.S. PATENT DOCUMENTS

| | | | |
|---|---|---|---|
| 3,200,949 | 8/1965 | Aulich et al. | 210/726 |
| 4,141,696 | 2/1979 | Marion et al. | 48/197 R |
| 4,205,962 | 6/1980 | Marion et al. | 48/197 R |
| 4,205,963 | 6/1980 | Marion et al. | 48/197 R |
| 4,274,968 | 6/1981 | Grutsch et al. | 210/666 |
| 4,315,834 | 2/1982 | Van Deraerschot | 252/373 |
| 4,465,596 | 8/1984 | Soyez | 210/634 |
| 4,466,810 | 8/1984 | Dille et al. | 48/197 R |
| 4,477,353 | 10/1984 | Messer | 210/727 |
| 4,500,324 | 2/1985 | Vuong | 210/729 |
| 4,502,868 | 3/1985 | Yaghmaie et al. | 44/51 |
| 4,525,280 | 6/1985 | Vasconcellos et al. | 210/728 |
| 4,555,329 | 11/1985 | Sykes et al. | 209/5 |
| 4,597,773 | 7/1986 | Quintana et al. | 48/197 R |
| 4,599,089 | 7/1986 | Stigsson et al. | 44/51 |
| 4,692,237 | 9/1987 | Hsu et al. | 210/728 |
| 4,705,537 | 11/1987 | Yaghmaie et al. | 210/712 |
| 4,854,942 | 8/1989 | Denney et al. | 210/634 |
| 4,861,346 | 8/1989 | Najjar et al. | 44/51 |
| 5,006,231 | 4/1991 | Oblad et al. | 210/709 |
| 5,073,271 | 12/1991 | Sander et al. | 210/710 |
| 5,178,770 | 1/1993 | Chung | 210/705 |
| 5,352,366 | 10/1994 | Courtaud et al. | 210/712 |

FOREIGN PATENT DOCUMENTS

| | | |
|---|---|---|
| 0213402 | 3/1987 | European Pat. Off. . |
| 0441209 | 8/1991 | European Pat. Off. . |
| 1042793 | 11/1958 | Germany . |
| 3439842 | 4/1989 | Germany . |
| 4003242 | 8/1991 | Germany . |

*Primary Examiner*—Cynthia L. Nessler
*Attorney, Agent, or Firm*—Wenderoth, Lind & Ponack

[57] ABSTRACT

An improved partial oxidation, gasification process using low grade hydrocarbon feedstock involving the steps of gasification, waste heat recovery and carbon removal under formation of a soot water slurry containing the unburned carbon and ash. The soot water slurry is filtered to form a filtercake of carbon and ash, which cake is removed from the process. A direct once-through, partial oxidation process is thereby established, avoiding the recycle of unburned carbon and ash. The method also comprises filtration of the soot-ash slurries containing 0.5–3% unburned carbon and 0.1–2% ash having appreciable amounts of Fe, Ni and V. The slurry is cooled to a temperature below 80° C. and filtered while confined between movable closed belts maintaining a constant pressure against the shrinking mass of carbon/ash particles until the moisture content is reduced to below 80% by weight. Flocculating agents are added to the soot slurry before filtration, one in the form of a cationic and the other in the form of an anionic flocculation agent. A flaky, or granular filtercake suitable for further processing is obtained.

4 Claims, 1 Drawing Sheet

5,628,911

FILTRATION OF SOOT/ASH WATER SLURRIES AND IMPROVED PARTIAL OXIDATION PROCESS FOR HYDROCARBON FEEDSTOCKS

BACKGROUND OF THE INVENTION

The invention relates to the filtration of soot/ash water slurries. Such slurries are obtained in a number of chemical processes such as chemical gasification processes using heavy hydrocarbon feedstocks. More specifically the invention concerns an improved partial oxidation, gasification process where the soot/ash water slurry emerging after the carbon removal step of such process is filtered off and disposed of directly.

Partial oxidation processes for hydrocarbon feedstocks were developed and commercialized during the 1950's. The best known processes, such as the Shell gasification process and the Texaco gasification process, have been utilized in a number of commercial plants.

Such gasification processes utilizing hydrocarbon feedstock normally comprise three principal steps:

Gasification, in which the feedstock is converted into raw synthesis gas in the presence of oxygen and steam.

Waste heat recovery in which high pressure steam is generated from the hot gases leaving the reactor, and Carbon removal, in which residual carbon contained in the reactor outlet gas is removed in a multistep water wash.

Hereby the unburned carbon from the gasifier will be made into a carbon slurry, an aqueous suspension containing soot and a significant amount of ash, depending on the feedstock, which has to be further processed and recycled.

Thus a serious drawback of such processes is that a certain percentage of the feedstock is not gasified and remains in the form of soot mixed with appreciable amounts of ash from the heavy hydrocarbon feedstock.

Traditionally the soot recovery is handled by two alternative routes:

1. The carbon is recovered by means of pelletising, where a distillate or a residual fuel oil is used to form agglomerates with the carbon particles. The pellets can easily be separated from the water and are recycled to the reactor and/or burned in a carbon oil furnace.

2. Alternatively the carbon slurry is contacted with naphta in an extractor to form naphta soot agglomerates. The agglomerates are subsequently decanted or sieved-off and converted into a pumpable mixture together with the feedstock and recycled to the reactor.

However, as the soot is heavily contaminated with ash the disposal of the soot/ash mixtures has gradually become the most serious problem for such gasification processes.

The possibility to separate the soot/ash mixture by filtration and to dispose of it directly is considered as an attractive solution, but has not been applied on a large scale.

More specifically, filtration has been used to recover soot for special applications, such as absorbent carbon, conductive carbon and carbon black. However, such applications will not solve the disposal problems in a large gasification plant.

The soot/ash slurry from the carbon separation step will normally contain 0.5–3% unburned carbon and 0.1–2% ash. The ash contains appreciable amounts of Ni, Fe and V. The filtering of such a slurry is extremely difficult. As the water is removed the slurry is gradually turned into a soapy paste which is very difficult to handle by normal filtration means. The final water content of the filtercake will be 85% or higher and the pasty consistency of such a filtercake makes it unsuitable for further handling.

Subsequent combustion will result in excessive caking and the high combustion temperatures needed to burn the soot create severe environment and corrosion problems.

To overcome these handling problems it has been proposed to add other solid matter to the slurry. Thus according to DE-A-4003242 a soot water slurry is mixed with sewage sludge (Klärschlamm), whereafter the excess water more easily can be removed from such mixture. Thereafter the remaining solid sludge can be deposited, but the heavy metals and other contaminations are not taken care of and the disposal problems are not solved.

SUMMARY OF THE INVENTION

The main object of the invention is to provide a method for filtration of a soot/ash water slurry resulting in a filtercake suited for subsequent handling and processing.

Another object of the invention is to carry out filtration to obtain a filtercake with significantly reduced water content forming granules or flakes instead of a soapy paste.

It is another object of the invention to employ the filtration method to provide an improved partial oxidation gasification process in the form of a once through-continuous process to obtain a filtercake suitable for further processing.

Still another object of the invention is to provide a partial oxidation process with no recirculation of ash and unburned carbon to improve the overall efficiency of the gasification process.

These and other objects of the invention are obtained by means of a filtration carried out at low temperatures below 80° C. while until the filtercake contains less than 80% water, preferably less than 75% water and is no longer soapy or pasty but is tranferred into flakes or agglomerates which are easily separated and well suited for subsequent transport and handling in a drying and/or combustion process.

DETAILED DESCRIPTION OF THE INVENTION

The filtration at low temperature can be conducted while confining the slurry between movable closed belts which exert a constant pressure against a shrinking mass of carbon/ash particles resulting from filtration of the slurry.

To further improve the filtering efficiency the soot slurry is mixed with two different polyelectrolyte flocculation agents; one cationic and the other anionic.

Initial filtering tests in the laboratory revealed that when the dry matter content of the filtercake was increased to 20% or higher, this resulted in the formation of dry flakes or agglommerates suitable for further processing. However, choosing carefully the optimal parameters for conventional filtration, using filter aid and optimizing the speed of the filterpress did not give a satisfactory result in realistic plant tests. The water content was still well above 85% and the resulting filtercake not suitable for further processing.

A new test series was then initiated, incorporating a cooling unit in front of the filtration section and using two polyelectrolyte flocculation agents, one negatively and one positively loaded. The soot slurry was cooled from 95°–90° C. to 60° C., 50° C. etc., and the dry matter content of the filtercake was measured.

The results of this test are given in table 1 below:

TABLE 1

| Slurry °C. | Slurry m³/h | Soot kg/m³ | Flocculant 1 l/h | Flocculant 2 l/h | Flocculant Total ppm | Dry matter % |
|---|---|---|---|---|---|---|
| 35 | 8.0 | 4.40 | 140 | 90 | 71.9 | 32.6 |
| 40 | 8.0 | 3.55 | 140 | 90 | 71.9 | 28.9 |
| 60 | 8.0 | 3.43 | 140 | 90 | 71.9 | 26.3 |
| 53 | 8.0 | 3.30 | 140 | 90 | 71.9 | 25.0 |

Figure 2:
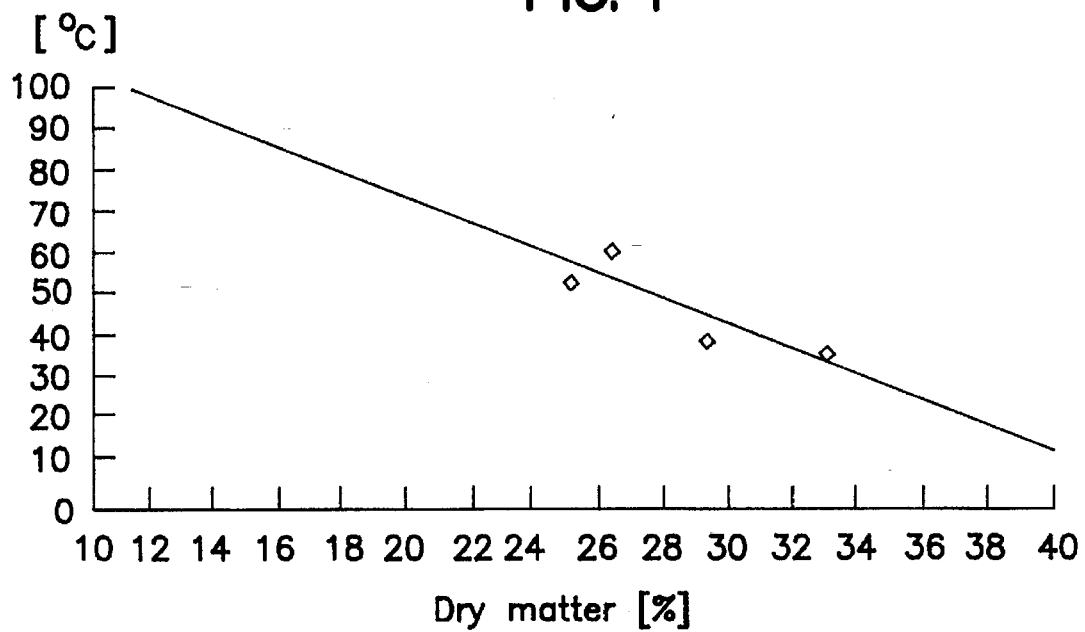
FIG. 2 is a graph showing the dry matter content of the filtercake at different soot slurry temperatures.

Surprisingly it was found that low temperature increased the efficiency of the filtration as is also illustrated in FIG. 2. At slurry temperature >80° C. it is not possible to obtain a filtercake with a satisfactory consistency as the dry matter content then will be below 20%, even if the other filtration parameters are optimized.

Utilizing the results for the initial tests a full scale filtration method has been developed and successfully tested. In the flow sheet of FIG. 1 is shown a completely integrated gasification process where heavy residue oil is reacted in a conventional gasification unit with soot separation.

Figure 1:
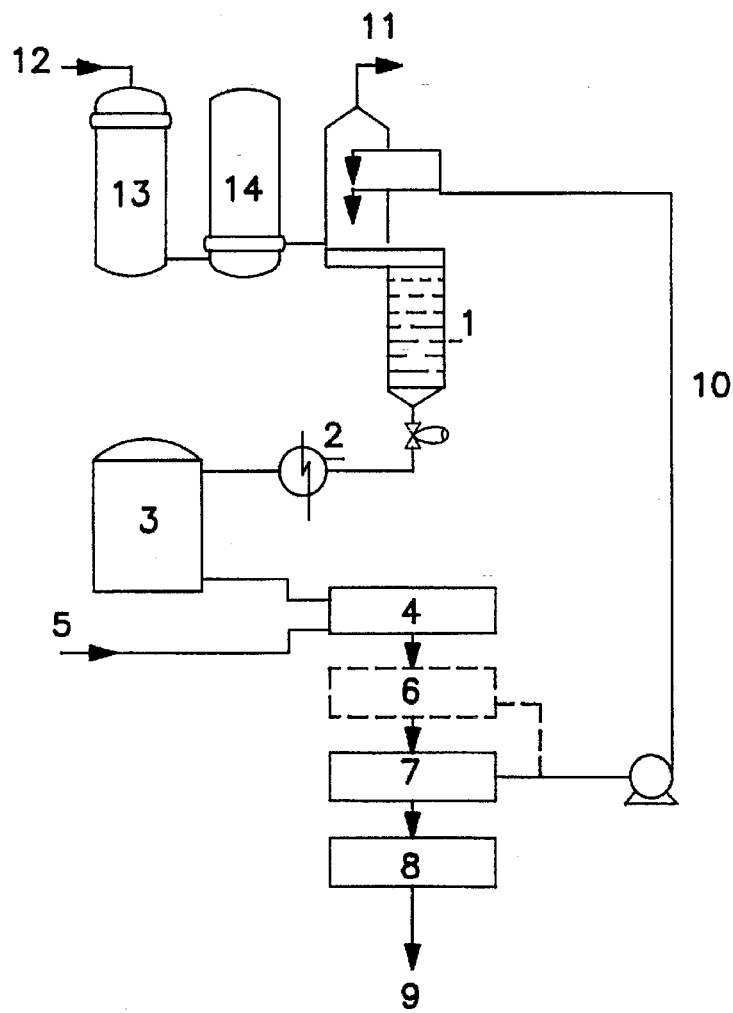
FIG. 1 shows a flow sheet of the filtration process of the present invention.

According to a preferred embodiment of tho invention, and as illustrated in FIG. 1, the feed 12 is converted in the gasification unit 13 and the gas containing soot/ash is washed in the soot separation step 1. The crude gas 11 is then subjected to purification. The soot/ash water slurry emerging from the soot separation step 1 is initially passed through a cooler 2 to lower the temperature from approx. 95° C. to 20°–60° C. and fed into a soot slurry holding tank 3. The slurry is then passed through a mixer 4 to administer the flocculation agents from a source 5. Two flocculants were used, one positively charged polyelectrolyte sold under the trade mark Praestol 611BC (cationic) and one negatively charged polyelectrolyte sold under the trade mark Praestol 2440 (anionic), both being in the form of a white polyacrylamide granulate. The flocculants were added to the slurry in a mixer tank 4 as 0.1–0.3% solutions in water. The total volume of flocculants added was adjusted to between 60–100 ppm and the ratio of cationic:anionic polyelectrolyte was 1.5:1.

Thereafter the slurry was let into a settling tank 6 where the settled mass was removed at the bottom and excess water removed from the top and returned through pipe 10 to the soot separation step 1.

An integrated filter unit 7 was installed after the sedimentation or settling unit 6. However, the sedimentation step is optional and it is possible to supply the filter unit with slurry from the mixer 4.

The slurry was dewatered while confined on the movable filter 7, consisting of a horizontally movable filterband followed by two vertically moving filterbands compressed by means of rollers pressing the filterbands together to exert a constant pressure until the water content of the filtercake was reduced to <80%. Thereafter the filtercake was released onto a movable conveyor belt, in the form of dry flakes or plates with an average thickness of approx. 2 mm, and fed to a combustion unit 8. The product 9 could be handled and further processed without any problems. The filtrate was also directly suited for washing of the filtercake which was carried out continuously and the filtrate could be returned to the soot separation step without detrimental effects in the filtration process.

We claim:

1. A method for treatment of an aqueous soot/ash slurry, containing 0.5–3% unburned carbon and 0.1–2% ash having appreciable amounts of Fe, Ni and V, said method comprising:

cooling the slurry to a temperature of from 20°–60° C.;

adding flocculants comprising one cationic flocculant and one anionic flocculant to the cooled slurry, where the total amount of flocculants is 60–100 ppm; and filtering the resultant slurry until the moisture content of the slurry is reduced to below 80% by weight, to obtain a flaky or granular filtercake.

2. The method according to claim 1, wherein the flocculants are added in ratio of cationic:anionic polyelectrolyte of about 1.5:1.

3. The method according to claim 1, wherein the moisture content of the slurry is reduced to below 75%.

4. The method according to claim 1, wherein the filtering of the slurry is conducted while confining the slurry between movable closed belts which exert a constant pressure against a shrinking mass of carbon/ash particles resulting from filtration of the slurry.

* * * * *